Oct. 13, 1942.         A. J. LEWIS              2,298,391
                   WAD FORMING MACHINE
              Filed Aug. 25, 1939        4 Sheets-Sheet 1

INVENTOR
ARTHUR J. LEWIS
BY
ATTORNEY

Oct. 13, 1942.    A. J. LEWIS    2,298,391
WAD FORMING MACHINE
Filed Aug. 25, 1939    4 Sheets-Sheet 2

INVENTOR
ARTHUR J. LEWIS
BY
ATTORNEY

Oct. 13, 1942.   A. J. LEWIS   2,298,391
WAD FORMING MACHINE
Filed Aug. 25, 1939   4 Sheets-Sheet 3

INVENTOR
BY
ATTORNEY

Oct. 13, 1942.    A. J. LEWIS    2,298,391
WAD FORMING MACHINE
Filed Aug. 25, 1939    4 Sheets-Sheet 4

INVENTOR.
BY
ATTORNEYS.

Patented Oct. 13, 1942

2,298,391

UNITED STATES PATENT OFFICE 2,298,391

WAD FORMING MACHINE

Arthur J. Lewis, Stratford, Conn., assignor to Remington Arms Company, Inc., a corporation of Delaware Application August 25, 1939, Serial No. 291,857

4 Claims. (Cl. 92—59)

This invention relates to a machine for molding of articles from a slurry containing wad-forming materials and particularly the molding of wads for shot shells, although it is not limited to molding said wads.

As is brought out in the process described in the patent to Woodford (2,026,765), it is possible to mold gun wads individually from a mixture of a relatively coarse fibrous material such as hair, a relatively fine and partially hydrated material such as a wood pulp and a somewhat granular filler material such as sawdust. Varying proportions of these may be mixed, such as disclosed by Woodford, although it is to be understood that as far as the present invention is concerned, the particular mixture is immaterial. The materials selected after being prepared in the desired manner are then put into suspension in a liquid in a concentration up to about 10%, a concentration on the order of 1% being preferable, this likewise being a matter of choice. In the production manufacture of gun wads, it is necessary that a machine be employed that will cheaply and accurately produce the wads in quantity, and such is one of the objects of the present invention.

Further objects of the invention will appear from the following description taken in connection with the accompanying drawings.

Figure 3:
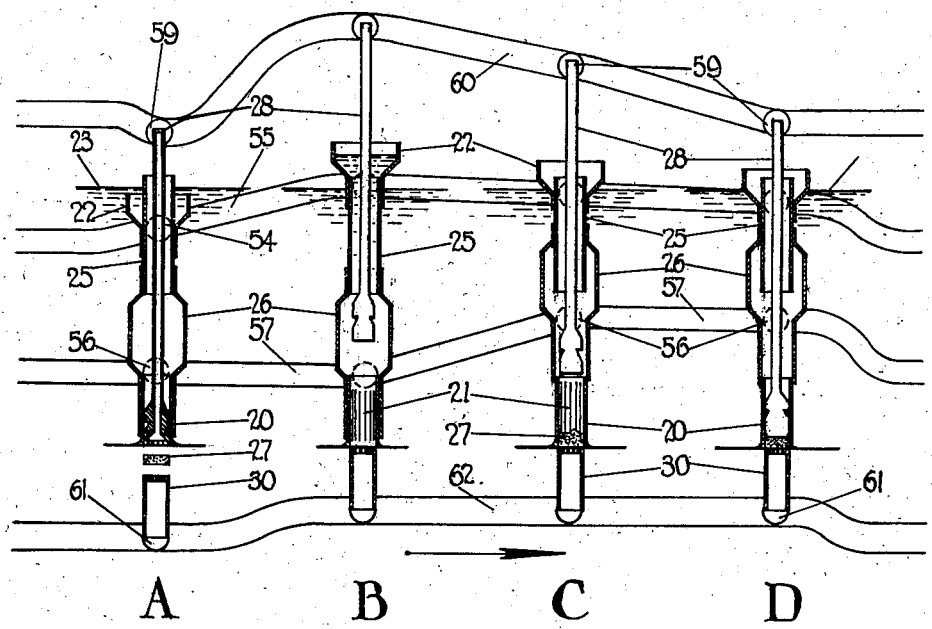
Fig. 3 is a diagrammatic view showing the sequence of the various operations.

A description of the sequence of operations will be first given having special reference to Fig. 3, which will be followed by a detailed description of the machine.

The machine in general is of the rotating type having stationary cam races that actuate the various moving parts, said moving parts being mounted on a rotating carrier, there being any desired number of complete individual molding assemblies mounted on the carrier. It is evident that the assemblies may be grouped and more than one operated at the same time by a single set of cam rollers. The slurry is fed to a stationary slurry holding means from where it is fed to a slurry container, said slurry container being mounted on the carrier and rotating therewith.

The slurry is fed in measured quantities to a tubular mold, said mold having lateral drainage perforations, the perforations being covered by an imperforate sleeve during the time that the material is fed thereto. A recirpocating plunger having a plurality of holes therein closes the bottom of the mold. The wad material settles quickly to the bottom of the mold and the sleeve is raised, allowing the excess liquid to pass through the lateral perforations. A plunger then comes down on the wad and compresses it, squeezing out more of the liquid through a plurality of holes located in the plunger and through the holes in the bottom plunger. As described in Woodford, the wad-forming material, due to the axial and lateral drainage, becomes properly arranged in the formed wad. The lower plunger is then withdrawn and the upper plunger moves further downwardly, thereby ejecting the formed wad.

Figure 1:
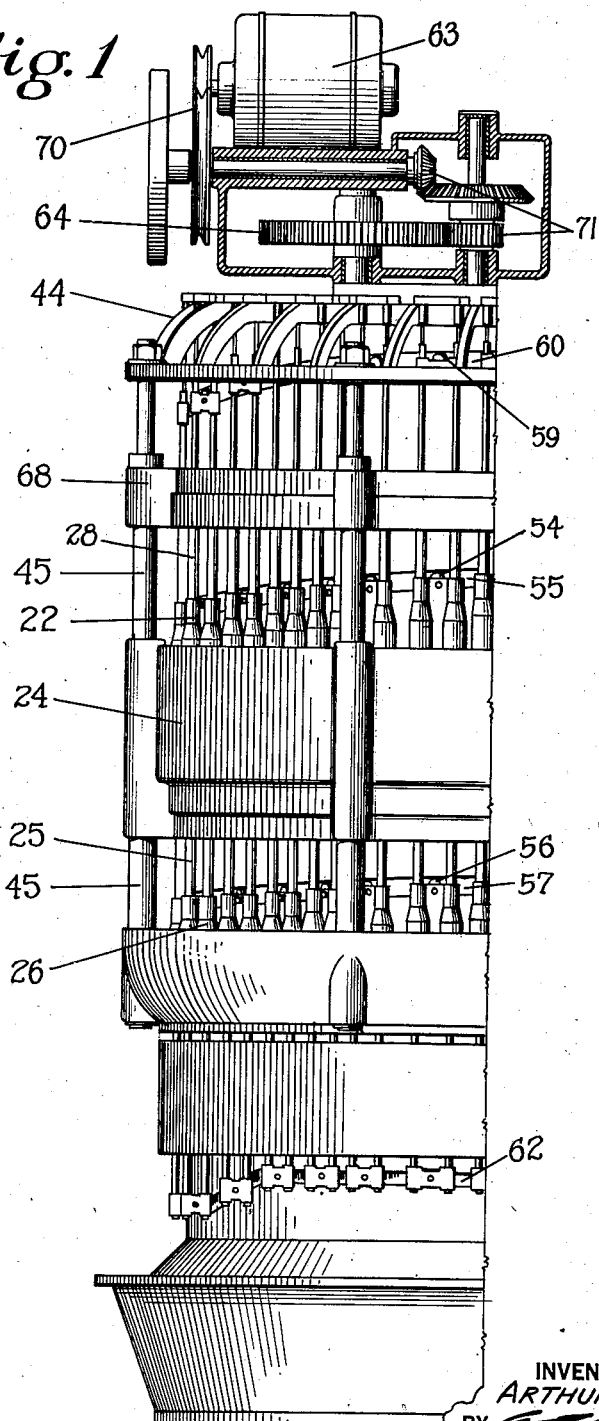
Fig. 1 is an elevation of the left half of the device in the direction indicated by the line 1—1 of Fig. 2.
Figure 1A:
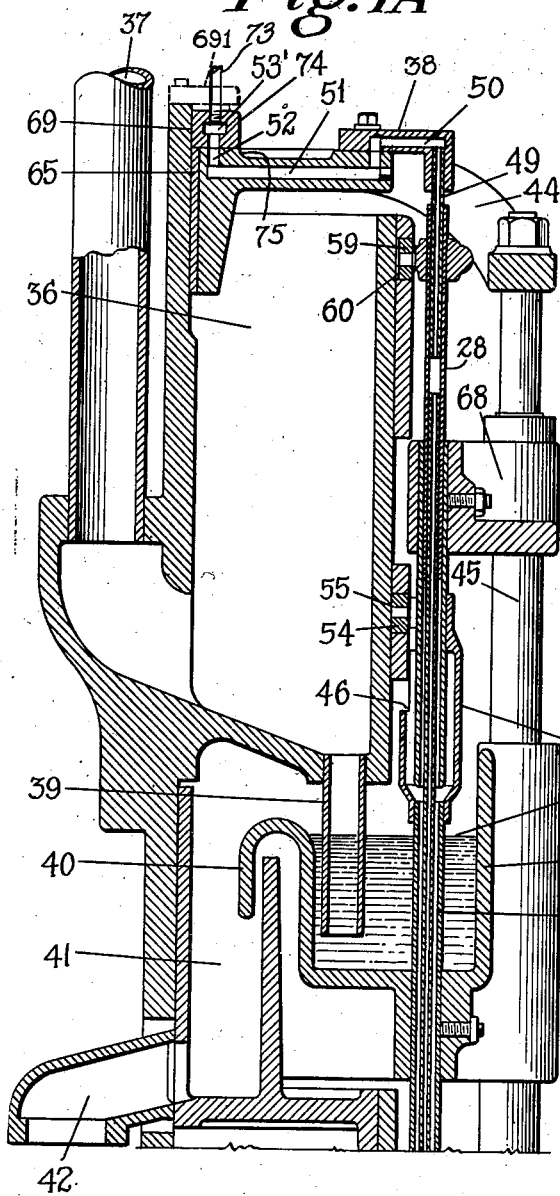
Fig. 1A is a sectional elevation of the upper part of the device, approximately along the line IA—IB of Fig. 2.
Figure 1B:
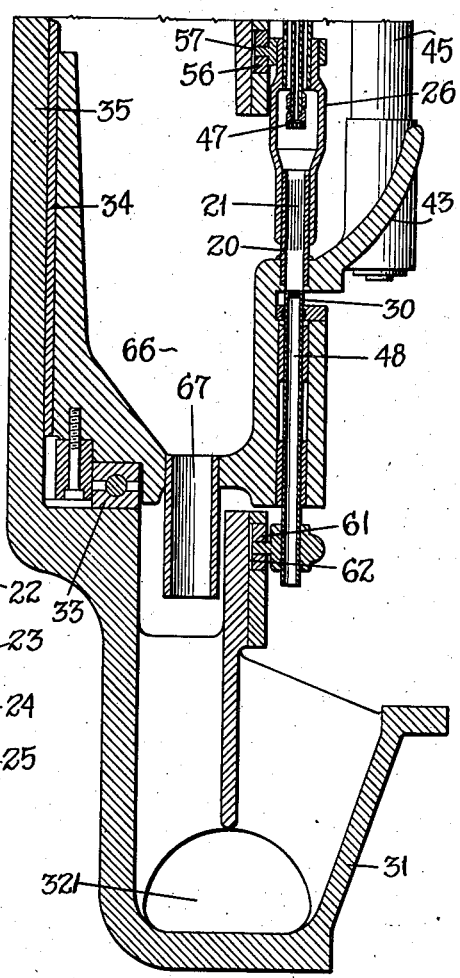
Fig. 1B is a sectional elevation of the lower part of the device, approximately along the line IA—IB of Fig. 2.
Figure 4:
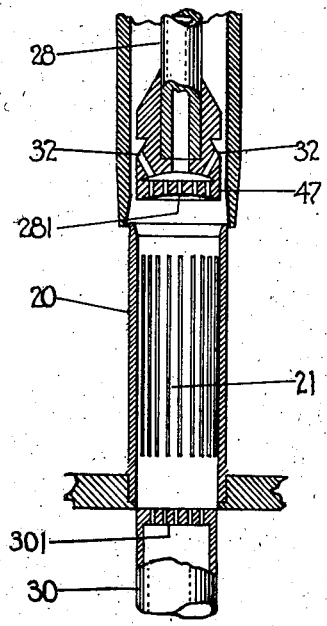
Fig. 4 is a sectional view of one of the individual molding elements.

In the formation of wads there are in general four moving parts that may be operated by suitable cam surfaces located on the periphery of stationary portions of the machine. Referring now to Fig. 3, a description will be given of the sequence of events in the formation of the wads as applied to a single molding element assembly. As stated above, the slurry contains the wad-forming materials in low concentration such that they will settle out rapidly. A tubular mold 20 having lateral perforations 21 has the slurry containing the wad-forming materials fed thereto. This is done by means of the slurry measuring means 22, which at the start of the operation, as at A, is below the surface 23 of the slurry in a slurry container 24 (Fig. 1A). As the machine rotates, the various parts are reciprocated in their vertical directions by contact with vertical cams located on stationary portions of the machine. The slurry measuring means is moved upwardly as the machine advances, from A to B for example, until it reaches the upper end of the tube 25, which allows the slurry contained in the slurry measuring means 22 to flow through the tube 25 and into the tubular mold 20. At this time the imperforate sleeve 26 is in its downward position covering the perforations 21 of the tubular mold 20. As the machine advances further in its rotation, the imperforate sleeve 26 is moved upwardly, as seen at C, allowing the liquid to flow outwardly through the lateral perforations 21 after the wad-forming material has settled at the bottom of the mold as at 27. Further rotation of the element, to D, causes the hollow reciprocating plunger 28 to move downwardly against the wad 27, compressing the wad material. The reason for the plunger being hollow will become apparent presently. The lower end of the plunger 28 has a plurality of holes 281 (Fig. 4) to allow the escape of water or excess slurry upwardly. The lower plunger 30 also has holes 301 which allow passage of the liquid downwardly. At this point, air is introduced into the hollow reciprocating plunger 28, which forces the excess liquid up through the openings 32 (Fig. 4) of the plunger 28. As the machine continues its rotation, the individual element will be returned to the position indicated at A (Fig. 3), where the lower reciprocating plunger 30 is withdrawn and the hollow reciprocating plunger 28 makes a further downward movement through the tubular mold 20, ejecting the formed wad. A blast of air through the hollow reciprocating plunger 28 may be utilized to assist the ejection of the wad from the bottom of the plunger.

Figures 2, 5:
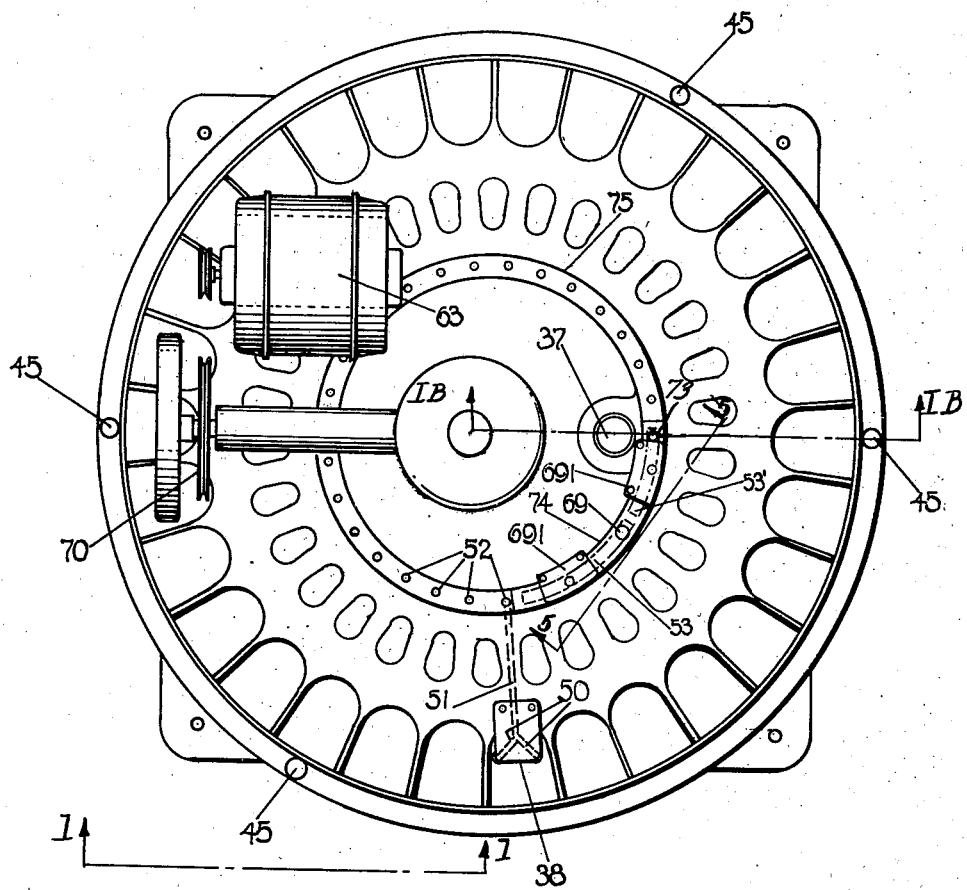
Fig. 2 is a plan view with portions thereof in section.
Fig. 5 is an enlarged fragmentary elevational view of the air valves looking in the direction of 5—5 of Fig. 2.

The machine comprises a stationary base 31 having a drainage trough 321 therein. The movable parts of the machine are mounted on the base and may be circular and rotatable thereon. They are mounted on the ball bearings 33 and the friction bearing 34 on the upstanding portion 35 of the base 31. The stationary slurry holding tank 36 is fed by the pipe 37 with the slurry containing the wad-forming materials, said tank being a separate casting or integral with base 31. The stationary slurry holding tank 36 has pipes 39 at spaced points, feeding the slurry into the slurry container 24. The presence of pipes 39 assists in the agitation of the slurry in container 24 as the container 24 rotates. The overflow from the slurry container will flow over the edge 40 and be returned from the annular chamber 41 through pipe 42 to a recovery tank or to waste, thereby keeping a constant level of the slurry. The moving parts of the machine are supported by a lower carrier ring 43 which, as stated, has bearing surfaces 33 and 34 with the main frame. At the upper portion of the machine, a spider-like frame 44 is spaced from the lower carrier ring 43 by means of rods 45 which may have suitable adjustable connections with the frame 44. The slurry container 24 is carried by the rods 45 in the correct position, as will be described later. As previously stated, a number of individual wad molding elements may be located about the periphery of the moving carrier, said rotating carrier including the lower carrier ring 43, the rods 45, guide frame 68 and upper frame 44. The tubular molds 20 having lateral perforations 21 are mounted on the lower carrier ring 43. Surrounding the tubular molds are the imperforate sleeves 26, which are slidably mounted at their lower end on said tubular molds. The tubes 25 are carried by the slurry container 24. At the upper end of said tubes 25 and slidable thereon are located the slurry measuring means 22, said slurry measuring means sliding downward on said tube and being filled by the slurry within the container 24 through the opening 46 in said slurry measuring means. The container is so positioned that the measuring means will be below the surface of the slurry at the lower portion of their travel. The hollow reciprocating plunger rod 28 carries at its lower end a wad-forming plunger 47. The lower reciprocating plungers 30 are mounted at 48, closing the bottom of the molds. The hollow reciprocating plungers 28 have tubes 49 entering the inside thereof at the upper end for the purpose of receiving air from the passages 50. The tubes 49 are fastened to plates 38 and have a substantially air-tight sliding connection interiorly of tubes 28, only one of the plates being shown in Fig. 2. Said passages 50 are connected by means of passages 51 to the openings 52 which, at predetermined points in the rotation of the carrier, register with similar openings 53 and 53' in the stationary valve housing 74 located on the frame, supplying air to the hollow plungers and thereby to the openings in the lower end of said plunger 28, as will be described in detail later. The slurry measuring means 22 is reciprocated vertically by means of a cam roller 54 engaging a cam race 55 located on the stationary slurry holding means 36. Reciprocation of the slurry measuring means carries a measured charge of the slurry upwardly as at A—B (Fig. 3) until the upper part of tube 25 has been reached, whereupon said charge will feed into the mold 20. The imperforate sleeve 26 at this point will cover the lateral perforations 21 of the tubular mold 20. The sleeve 26 is reciprocated in a vertical direction by means of the cam roller 56 operating in the cam race 57 located on a stationary portion of the machine. As the machine rotates, the sleeve is drawn upwardly, allowing the excess water or liquid to escape. The hollow reciprocating plunger 28 is operated by the cam roller 59 operating in the cam race 60 located on the upper surface of the stationary slurry holding means 36.

The plunger 28 is reciprocated downwardly and compresses the wad in the tubular molds 20. At this time, the mold closing plunger 30 is against the bottom of the mold and the wad is compressed. At this point in the rotation of the machine, a passage 52 registers with passage 53, allowing air to flow through the hollow plunger 28 and causing the excess liquid to be forced through passages 32 (Fig. 4) and away from the formed wad, air being fed to the hollow passage 53 through pipe connection 69. Plates 691 serve to clamp the valve block 74 in position over the ring 75. The air pressure is required, as otherwise the liquid would not be removed and would be again absorbed by the wad. As the carrier rotates further from position D to A of Fig. 3, the hollow plunger 28 is caused to make another downward movement by the cam race 60, ejecting the wad onto a suitable receiving means therefor. The air passage 53' registers with 52 and feeds air to the plunger assisting in the ejection of the wad, air being fed to the hollow passage 53' through a pipe connection at 73. It is to be understood that different arrangements of the air valves may be used.

The rotating carrier may be operated by a suitable driving means or motor 63 through gearing 64, the carrier being guided in its rotation by bearings 33, 34 and 65.

The excess liquid that is drained from the tubular molds 20 is caught in the annular receptacle 66 and is led to the drainage trough 321 by pipe or pipes 67.

The driving motor 63 operates the pulleys 70 that in turn drive the gears 71, one of said gears being mounted on a shaft which may have a suitable pinion thereon to engage gear teeth located on the carrier to rotate the same.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a machine for making gun wads from a slurry of wad-forming materials, the combination comprising: a frame; a stationary slurry holding means; a rotatable carrier; a slurry container, tubular wad molds provided with lateral drainage perforations and a tube for each mold having an open end extending above the slurry in said container, said container, molds and tubes being mounted on and rotatable with the carrier; connections between said holding means and the container to feed slurry thereto; a stationary cam race on said frame; a slurry measuring means slidably mounted on each tube and engaging said cam race, the measuring means being moved upwardly by the cam race to feed slurry from the container into a mold through the open end of the tube upon rotation of the carrier; a second stationary cam race on the frame; an imperforate sleeve on each mold engaging said second cam race and slidable to uncover said lateral drainage perforations upon rotation of the carrier; a third stationary cam race on the frame; a wad-forming plunger reciprocable interiorly within each mold and tube and engaging said third cam race to be reciprocated for forming a wad after slurry has been fed to a mold as the carrier is rotated; a fourth stationary cam race on the frame; and a reciprocable lower plunger for each mold closing the bottom thereof, said reciprocable lower plunger engaging the fourth stationary cam race to uncover the mold after the wad-forming operation is complete.

2. In a machine for making gun wads from a slurry of wad-forming materials, the combination comprising: a frame; a stationary slurry holding means; a rotatable carrier; a slurry container, tubular wad molds provided with lateral drainage perforations and a tube for each mold having an open end extending above the slurry in said container, said container, molds and tubes being mounted on and rotatable with the carrier; connections between said holding means and the container to feed slurry thereto; a stationary cam race on said frame; a slurry measuring means slidably mounted on each tube and engaging said cam race, the measuring means being moved upwardly by the cam race to feed slurry from the container into a mold through the open end of the tube upon rotation of the carrier; a second stationary cam race on the frame; an imperforate sleeve on each mold engaging said second cam race and slidable to uncover said lateral drainage perforations upon rotation of the carrier after slurry has been fed to a mold; a third stationary cam race on the frame; a wad-forming plunger reciprocable interiorly within each mold and tube and engaging said third cam race to be reciprocated for assisting in the formation of the wads from the wad material deposited in the molds; a fourth stationary cam race on the frame; and a reciprocable lower plunger for closing the bottom of each mold, said reciprocable lower plunger engaging a fourth stationary cam race to uncover the mold after the wad has been formed, said third cam race further moving the wad-forming plunger of the uncovered mold to eject the wad from the mold as the carrier is rotated after wad formation.

3. In a machine for making gun wads from a slurry of wad-forming materials, the combination comprising: a frame; a stationary slurry holding means; a rotatable carrier; a slurry container, tubular wad molds provided with lateral drainage perforations and a tube for each mold having an open end extending above the slurry in said container, said container, molds and tubes being mounted on and rotatable with the carrier; connections between said stationary holding means and said container to feed slurry thereto; a stationary cam race on said frame; a slurry measuring means slidably mounted on each tube and engaging said cam race, the measuring means being moved upwardly by the cam race to feed slurry from the container into a mold through the open end of the tube upon rotation of the carrier; a second stationary cam race on the frame; an imperforate sleeve on each mold engaging said second cam race and slidable to uncover said lateral drainage perforations upon rotation of the carrier; a third stationary cam race on the frame; a hollow wad-forming plunger reciprocable interiorly within each mold and tube and engaging said third cam race to be reciprocated for assisting in the formation of the wads after the slurry has been fed to a mold as the carrier is rotated; connections from said hollow plungers to openings in a ring mounted on the rotating carrier; an air supply valve cooperating with said ring to supply air to the hollow plunger to assist in the removal of excess fluid as the wad is being formed; a fourth stationary cam race on the frame; a reciprocable lower plunger for each mold for closing the bottom thereof, said reciprocating members engaging the fourth stationary cam race to uncover the mold after the wad forming operation is complete; said third cam race then further moving the hollow plunger to eject the wad through the bottom of the mold when it is uncovered; and a second air supply valve cooperating with said ring to feed air to the hollow plunger to assist in the ejection of the formed wad.

4. In a machine for making gun wads from a slurry of wad-forming materials, the combination comprising: stationary slurry holding means; a rotatable carrier; a slurry container; connections between said holding means and the container to feed slurry thereto; a plurality of tubular wad molds provided with lateral drainage perforations; a sliding imperforate sleeve for each mold; an open end feeding tube for each mold, each tube having one end above the level of slurry in the container; a slurry measuring means slidably mounted on each tube; a reciprocating wad-forming plunger for each mold movable within its tube and mold; a lower reciprocating plunger for each mold and closing the bottom thereof, said sleeves, tubes, wad-forming and lower plungers and measuring means being mounted upon said carrier; a plurality of stationary cam races cooperating with said carrier to operate in proper sequence each of the sleeves, slurry measuring means, reciprocating wad-forming plungers and lower reciprocating plungers upon rotation of said carrier; and means to rotate the carrier whereby upon rotation of the carrier said slurry measuring means measures and feeds the slurry to the tubular molds through the tubes, the sleeves uncover the drainage perforations of the molds and the reciprocating wad-forming and lower plungers form the wad material deposited in the molds.

ARTHUR J. LEWIS.